(12) United States Patent
Herzer

(10) Patent No.: US 7,739,996 B2
(45) Date of Patent: *Jun. 22, 2010

(54) PORTABLE GAS POWERED INTERNAL COMBUSTION ENGINE ARRANGEMENT

(76) Inventor: Bernardo J. Herzer, 3863 Westwood Blvd., Culver City, CA (US) 90232

( * ) Notice: Subject to any disclaimer, the term of this patent is extended or adjusted under 35 U.S.C. 154(b) by 0 days.

This patent is subject to a terminal disclaimer.

(21) Appl. No.: 12/455,790

(22) Filed: Jun. 8, 2009

(65) Prior Publication Data

US 2009/0283066 A1 Nov. 19, 2009

Related U.S. Application Data

(63) Continuation of application No. 12/221,869, filed on Aug. 6, 2008, which is a continuation of application No. 11/702,381, filed on Feb. 6, 2007, now Pat. No. 7,424,886.

(51) Int. Cl.
*F02B 67/00* (2006.01)
*F16M 1/00* (2006.01)
*F02G 5/00* (2006.01)

(52) U.S. Cl. .................................. 123/195 A; 123/557
(58) Field of Classification Search ................ 123/1 A, 123/543, 557, 195 A
See application file for complete search history.

(56) References Cited

U.S. PATENT DOCUMENTS

| | | | |
|---|---|---|---|
| 3,018,914 A | 1/1962 | Webster | |
| 3,941,554 A | 3/1976 | Curtis | 431/89 |
| 4,327,553 A | 5/1982 | Rilett | 60/673 |
| 4,492,208 A | 1/1985 | Lent | 123/527 |
| D295,886 S | 5/1988 | Dolton et al. | D23/205 |
| 4,819,589 A | 4/1989 | Nagashima | 123/184.23 |
| 4,827,147 A | 5/1989 | Mizushima | 290/1 |
| 4,881,520 A | 11/1989 | Hefling | 126/44 |
| 4,912,303 A | 3/1990 | Beavers et al. | 219/535 |
| 5,086,748 A | 2/1992 | Yokoyama | 323/549 |
| 5,162,662 A | 11/1992 | Nakayama | 290/1 |
| 5,212,952 A | 5/1993 | Yokoyama et al. | 60/721 |
| 5,335,954 A | 8/1994 | Holub et al. | 294/31.2 |
| 5,542,398 A | 8/1996 | Marcon | 123/525 |
| 5,581,986 A | 12/1996 | Calver | 56/12.7 |
| 5,606,944 A | 3/1997 | Kurihara | 123/90.3 |
| 5,671,711 A | 9/1997 | Collie | 123/299 |
| 5,676,117 A | 10/1997 | Williams | 123/527 |
| 5,713,343 A | 2/1998 | Taylor et al. | 126/4 |
| 5,884,460 A | 3/1999 | Serravalle et al. | 56/1 |
| 5,896,847 A | 4/1999 | Usuki | 123/557 |
| 5,918,574 A | 7/1999 | Kobayashi | 123/195 |

(Continued)

FOREIGN PATENT DOCUMENTS

JP 3-111658 5/1991

(Continued)

*Primary Examiner*—Hai H Huynh
(74) *Attorney, Agent, or Firm*—Don Finkelstein

(57) ABSTRACT

A gas powered internal combustion engine in which the gas is provided from pressurized liquid gas in an LPG container and in which the LPG container is rigidly mounted adjacent to the internal combustion engine at a preselected angle to be in conductive heat transfer relationship to the internal combustion engine and in vibration receiving relationship to the internal combustion engine whereby the liquefied gas in the LPG container is heated and the effective surface area thereof is increased.

9 Claims, 8 Drawing Sheets

U.S. PATENT DOCUMENTS

| | | | |
|---|---|---|---|
| 5,924,400 A | 7/1999 | Kobayashi | 123/196 |
| D418,809 S | 1/2000 | Frank | D13/112 |
| 6,310,404 B1 | 10/2001 | Frank | 290/1 |
| 6,441,505 B1 | 8/2002 | Poletti et al. | 290/1 |
| 6,661,107 B2 | 12/2003 | Higuchi et al. | 290/1 |
| 6,750,556 B2 | 6/2004 | Sodemann | 290/1 |
| 6,857,351 B2 | 2/2005 | Cutter et al. | 99/279 |
| 7,412,973 B2 | 8/2008 | Price | 123/538 |
| 7,424,886 B1 * | 9/2008 | Herzer | 123/557 |
| 2007/0089692 A1 | 4/2007 | Kochi et al. | 123/44.7 |
| 2009/0235904 A1 * | 9/2009 | Herzer | 123/557 |
| 2009/0241914 A1 * | 10/2009 | Herzer | 123/543 |
| 2009/0241916 A1 * | 10/2009 | Herzer | 123/557 |
| 2009/0241917 A1 * | 10/2009 | Herzer | 123/557 |

FOREIGN PATENT DOCUMENTS

| | | |
|---|---|---|
| JP | 8-11558 | 1/1996 |
| JP | 9-151749 | 6/1997 |
| JP | 9-250388 | 9/1997 |
| JP | 11-241653 | 7/1999 |
| JP | 281-182634 | 7/2001 |

* cited by examiner

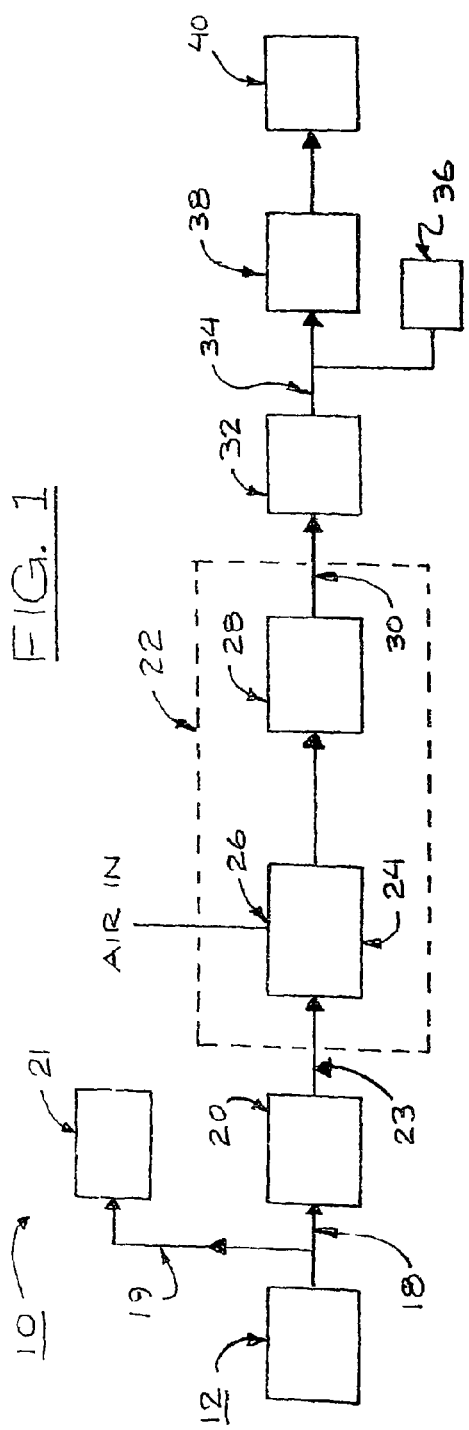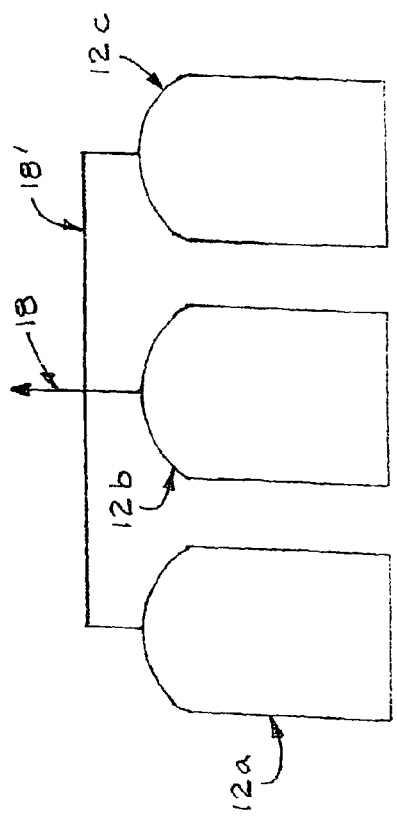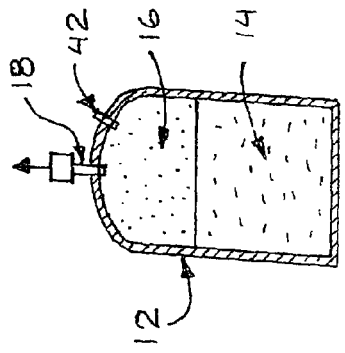

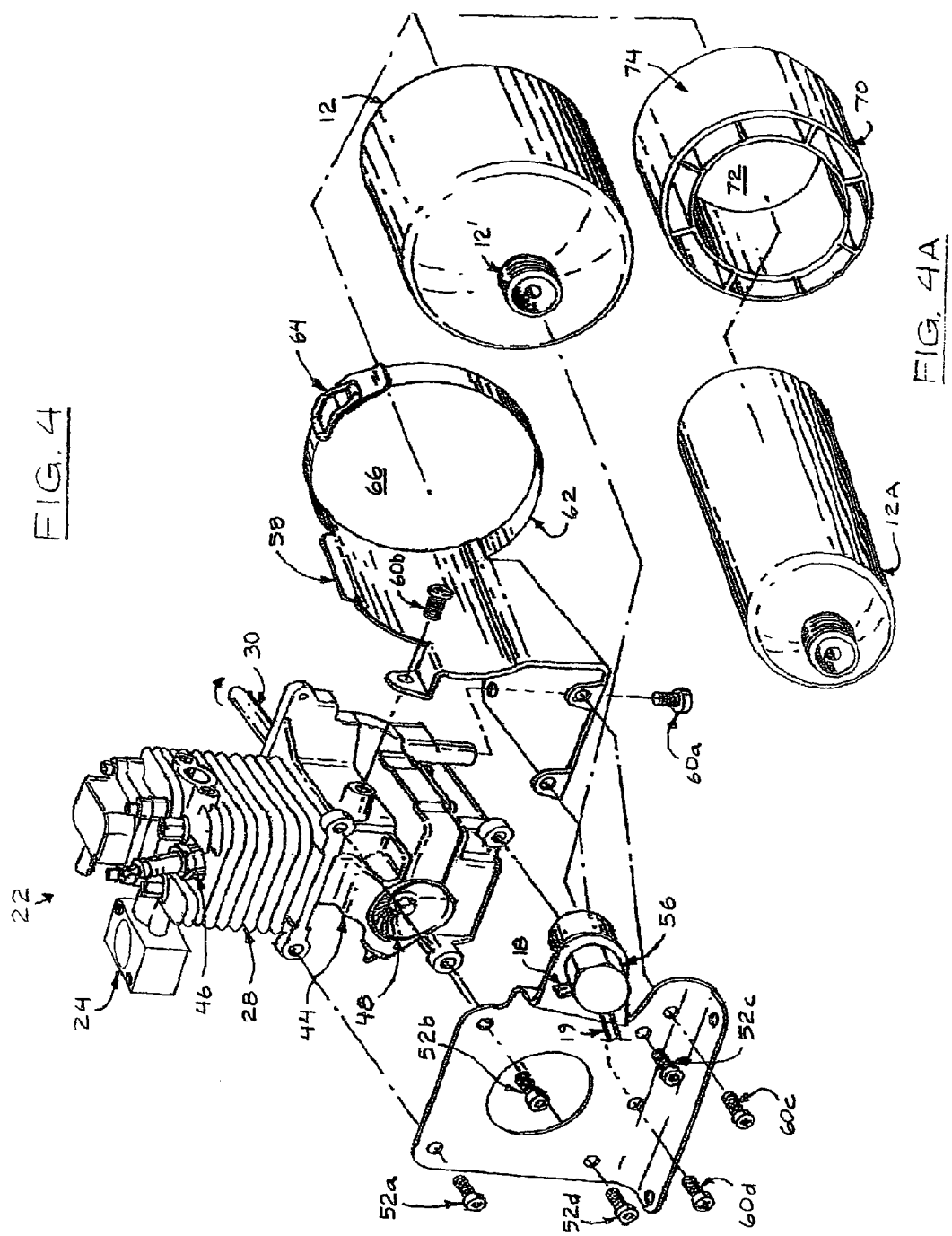

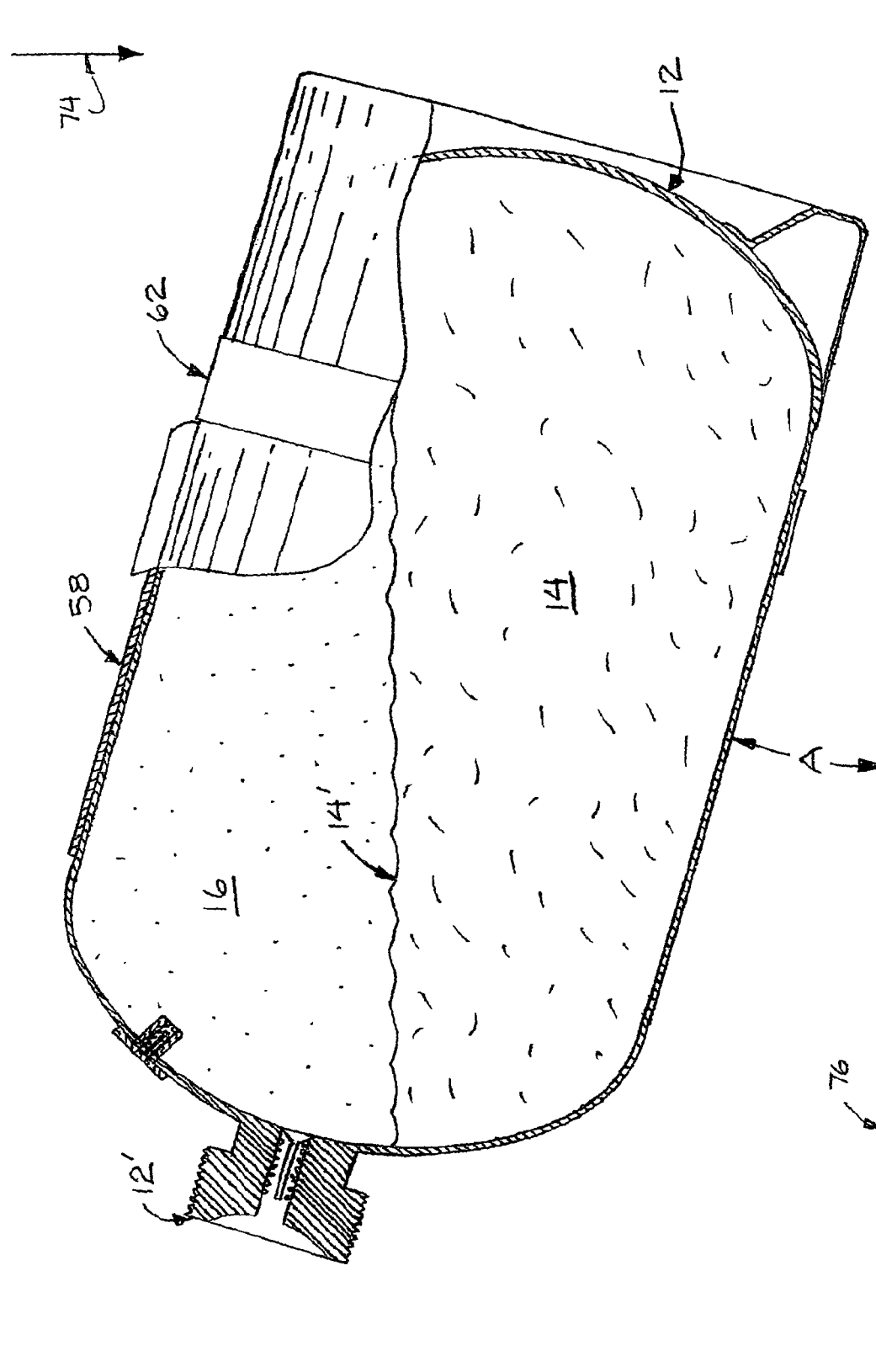

PORTABLE GAS POWERED INTERNAL COMBUSTION ENGINE ARRANGEMENT

REFERENCE TO RELATED APPLICATIONS

This application is a continuation of my co-pending application Ser. No. 12/221,869, filed Aug. 6, 2008 which is a continuation of application Ser. No. 11/702,381 filed Feb. 6, 2007, now U.S. Pat. No. 7,424,886 issued Sep. 16, 2008.

BACKGROUND OF THE INVENTION

1. Field of the Invention

This invention relates to a gas powered internal combustion engine which may be utilized to drive a variety of devices and may be utilized in one application as an emergency power source for generating electrical power. As utilized herein the term "gas" refers to a fluid in the gas state as a product which is emitted from a fluid in the liquid state which is stored under pressure and as contained, for example, in an LPG: Liquefied Petroleum Gas, commonly known as propane, container, or butane or the like. As utilized herein, the terms gas state, liquid state and fluid are used in the technical sense. That is, fluid is defined to mean a substance that can fill the volume of the container in which it is placed and includes both gas state and liquid state of the substance. "Gasoline" is used herein to define the liquid hydrocarbon based fuels generally used to power the engines of automobiles, trucks and the like.

2. Description of the Prior Art

There are many applications where a portable source of power is desired. These applications include the operation of many rotary devices such as portable gardening tools including hedge trimmers, weed cutters, small chain, reciprocating or rotating saws, and the like. Such devices are used while the user thereof is mobile. These devices are often driven by a small internal combustion engine using gasoline as the energy source and having a small tank for the gasoline as part of the equipment and providing a rotary output through a rotating drive shaft driven by the internal combustion engine to drive the particular device. As such, they require the storage of gasoline for the continued operation thereof in order to periodically refill the small gasoline tank. However, the storage of gasoline is highly restricted as to the type of container in which it may be stored, the places where it may be stored, the amount that may be stored and the environmental conditions under which it may be stored.

Another application of portable sources of power is in the field of devices that, while portable, are generally stationary during use. This field of devices includes portable electric generators utilized for emergency power or to provide electrical energy in locations where other electrical energy is not available. Many of these portable electrical power generators are driven by an internal combustion engine. The larger types of these portable electric power generators as carried in emergency vehicles of various types utilize gasoline or diesel powered engines with comparatively large storage supplies of the gasoline or diesel oil. Such devices are, of course, large and cumbersome and not adapted to be a readily portable device that may be easily carried by one person and transported from location to location.

However, there is a demand for an electric power generator that is small and light enough to be moved by one person from location to location and still provide a moderate amount of electrical power. These small electrical power generators are often driven by a small, light weight internal combustion engine. In this class of small, light weight internal combustion engine driven electrical generators it is often desired to store such device, either permanently or temporarily in the home, garage, vehicle or other location and also to store a comparatively large amount of fuel for use therein. In the situation of an electrical power outage in a residence, a small electrical power generator may be utilized to power a radio, recharge a cell phone or other such device, power a hot plate for cooking, provide illumination or for other desired activities. Other uses of a small internal combustion engine drive electrical generator are in campsites, on boats which do not have any other type of electrical power, and may other purposes.

The internal combustion engine that have heretofore been proposed for these small internal combustion engine driven electrical generators have been single cylinder, two cycle, engines in which the compression has been in the cylinder located in the crankcase thereof.

To meet these desiderata it is necessary that the fuel to power the internal combustion engine be of the type and in the condition that it may be stored in virtually any desired amount at the storage location of the engine powered electrical generator. The use of LPG is one type of fuel that may be utilized in an internal combustion engine in place of the gasoline or diesel to power the internal combustion engine that is utilized to drive the electrical generator, or other engine driven device. The LPG containers are pressurized so that the gas therein is converted to the liquid state and, as such, has an amount of fluid in the gas state above the vertically top level of the fluid in the liquid state.

One type of LPG storage bottle that has been proposed to provide power for these small internal combustion engine driven devices is a small container holding approximately 1 to 2 pounds of LPG contained in the bottle. These bottles have heretofore been utilized in various camping applications and are widely available.

In some of the prior art configurations, an LPG container was utilized and the LPG container required a particular rotational orientation about the long axis thereof in order to feed the gas therefrom because of a generally right angle bended feed tube in the container through which the gas flows to regions external the LPG container. Such a configuration limits the utility of such a device.

One very well known brand of such LPG bottles is the small LPG containers which are generally known to the public as Coleman Bottles. The Coleman Bottles are on the order of three and one half inches in diameter and on the order of seven and one half inches in axial length and contain about one to two pounds of the LPG. The Coleman Bottles come equipped with a standard threaded adapter for ready threading into a utilizing device and do not have any preferred orientation of rotation about the long axis thereof with respect to the device into which it is threaded. The adapter has an internal disconnect coupling for appropriate connection into a matching disconnect coupling which allows the flow of gas from the bottle when connected and prevents the flow of gas therefrom when disconnected. The Coleman Bottles are also provided with a built in pressure relief valve for safety in the event of over pressurization. The Coleman Bottles contain such a limited amount of LPG that a plurality of such bottles generally may, within the present laws and regulations, be stored in the home, in the garage or carried in a vehicle thus making them attractive as a substitute for use in many gasoline or diesel oil powered applications. However, the gas flow rate of the gas from the LPG in a Coleman Bottle is limited because of the comparatively small surface area of the LPG from which the gas is generated. In the event that too high a gas flow rate is demanded from the LPG in a Coleman Bottle, the LPG will freeze and thus effectively end the generation of the gas at usable flow rates from the LPG. Consequently, despite the attractiveness of the Coleman Bottles for use in many devices, the use of the Coleman Bottles has generally been limited to very low power requirement applications and have not been adapted for use in providing the energy for powering an internal combustion engine utilized to drive an electrical generator or other portable engine driven devices.

Thus, there has long been a need for a suitable arrangement in which a standard, readily available Coleman Bottle is utilized in an application in which power sufficient to drive a small electrical generator or other small portable engine driven devices is demanded.

Accordingly, it is an object of the present invention to provide an improved portable internal combustion engine driven device in which the engine is powered by LPG.

It is another object of the present device to provide an improved portable internal combustion engine driven device in which the engine is powered by LPG and the LPG is in a container having a comparatively small amount of LPG.

It is another object of the present device to provide an improved portable internal combustion engine driven device in which the engine is powered by LPG and the LPG is in a container having a comparatively small amount of LPG and the LPG container may be rotated about its axis to any desired position for operation and does not require a particular rotational position about its axis for operation.

It is yet another object of the present invention to provide an improved portable internal combustion engine driven device in which the engine is powered by LPG and the LPG is in a container having a comparatively small amount of LPG and in which a comparatively large and continuous flow of gas from the LPG in the container is obtainable.

It is a still further object of the present invention to provide an improved portable internal combustion engine driven device in which the engine is powered by LPG and the LPG is in a container having a comparatively small amount of LPG and the mounting of the LPG container with respect to the internal combustion engine allows a comparatively large and continues flow of gas from the LPG in the container.

SUMMARY OF THE INVENTION

The above and other objects of the present invention are achieved, in a preferred embodiment thereof, in an internal combustion engine driven device which for purposes of describing this embodiment may be an electrical energy generator. The internal combustion engine may be a four stroke, two stroke with appropriate oil injection, single cylinder air or liquid cooled engine, though larger types of engines may be utilized as desired for particular applications. The internal combustion engine may have an inertial or pull type starter to initiate operation thereof and such engines are readily available. The cylinder of the internal combustion engine is contained in a crankcase and the movement of the piston in the cylinder drives a crankshaft which is connected to the device to be driven such as the electrical generator. The combustion of the gas-air mixture in the cylinder of the internal combustion engine generates heat which heats the cylinder and crankcase of the engine. Further, the operation of the engine also vibrates the engine and all the structure associated with therewith.

The engine has a carburetor in which the gas is mixed with air to provide the explosive mixture that is introduced into the cylinder. The engine is provided with a spark plug to initiate the combustion of the gas-air mixture in the cylinder.

In accordance with the principals of the present invention a mounting plate is adjacent the crankcase of the engine and is coupled thereto. The mounting plate receives both heat from the crankcase and is vibrated by the vibration of the engine.

The gas provided to the carburetor is gas from the LPG contained in a Coleman Bottle arrangement of one or more Coleman Bottles. The Coleman Bottle type LPG container (whether called a Coleman Bottles or sold under any other brand name) in the arrangement is mounted on the mounting plate connected to the crankcase of the internal combustion engine to be in heat transfer and vibration transfer relationship thereto in a preferred orientation with respect to the horizontal. The Coleman Bottle may be of the configuration illustrated in U.S. design Pat. D295886. The Coleman Bottles may contain, in the smaller versions thereof, liquified petroleum gas on the order of 14 to 16 ounces. Such size LPG containers are the general type preferred for usage in the embodiments of the present invention. The preferred orientation is with the long axis of the Coleman Bottle LPG container at an angle of between 14° and 16°, with 15° being desired, for the present configuration of the Coleman Bottles. This angular orientation provides the very unusual and unexpected result of maximizing the gas flow and preventing the flow of liquid LPG from the Coleman Bottles. Since the Coleman Bottles are not filled to the top of the bottle with the LPG but have a predetermined and generally uniform from bottle to bottle volume of gas above the top surface of the LPG The selected angular orientation of the Coleman Bottles with respect to the horizontal is such that the surface area of the LPG is maximized but the outlet of the Coleman Bottles is vertically above the top surface of the LPG. Such orientation of the Coleman Bottles not only maximizes the usable surface area of the LPG from which the gas state is generated but also prevent the flow of LPG in the liquid state therefrom. The preferred angular orientation with respect to the horizontal may be selected for other LPG containers which may be utilized in other applications to achieve the unusual and novel configuration for evaporation of the gas from the liquid LPG. The Coleman Bottles have the additional advantage of being free from any requirement for a particular rotational position about its long axis for operation. That is, for the Coleman Bottles mounted as described herein, the Coleman Bottles may be in any rotational position about its axis and still provide operation.

The above described mounting of the Coleman Bottles on the mounting plate to be in thermal transfer relationship thereto for receiving heat as generated in the cylinder of the internal combustion engine as well as receiving vibration therefrom uniquely allows the continuous flow of larger amounts of gas from the LPG to thereby allow the powering of larger internal combustion engines and demand devices. The heat transferred to the Coleman Bottles heats the LPG contained therein to increase the evaporation of gas therefrom. The heat thus transferred to the LPG tends to keep the temperature of the liquid LPG above the freezing point even though comparatively larger amounts of gas are evaporated therefrom. The direct transfer of heat from the engine to the Coleman bottle and thus to the LPG therein has a dual benefit: the heat keeps the LPG from freezing and aids in cooling the internal combustion engine during the operation thereof. The transmittal of vibration of the Coleman Bottle by the operation of the engine also agitates the LPG to thus increase the effective surface area thereof thereby allowing even greater flow of gas therefrom and the agitation also helps in preventing the LPG from freezing.

The internal combustion engine has a rotating crankshaft that is driven by the operation of the piston in the cylinder and the crankshaft is connected to any desired device that is to be powered. For purposes of explanation of the principles of the present invention, the preferred embodiment of the invention is described and shown herein as having an electric generator driven by the internal combustion engine. However, many other devices may be driven by the internal combustion engine in structure incorporating the principles of the present invention.

The generator is driven by the internal combustion engine and provides electrical power. The electrical power may be alternating current and/or may also be direct current. Suitable receptacles for allowing plug in connection at the receptacles to electric powered devices are provided.

In order to provide even greater flow of gas, two or more Coleman Bottles may be mounted on the internal combustion engine and connected together to provide a single gas flow outlet therefrom.

In some applications of the preferred embodiment of the present invention it may be desired to utilize other gas powered devices of the type commonly used in many outdoor camping applications and the like. Such gas operated illumination, cooking, heating and similar devices generally have a built in pressure or flow regulator. A separate gas flow outlet tube may be provided from the Coleman Bottle to allow attachment and operation of these devices either independently or simultaneously with the operation of the electric generator.

In other applications of the present invention, gas powered internal combustion engine may be utilized to power such diverse implements as various gardening tools such as leaf blowers, edge trimmers, mowers, and the like as well as other devices where a safe, portable source of power is required.

BRIEF DESCRIPTION OF THE DRAWING

The above and other embodiments of the present invention may be more fully understood from the following detailed description taken together with the accompanying drawing wherein similar reference characters refer to similar elements throughout and in which:

FIG. 1 is a block diagram illustrating a preferred embodiment of the present invention;

FIG. 2 is a semi-schematic sectional illustration of a Coleman Bottle useful in the practice of the present invention, FIG. 3 is a schematic representation of an LPG arrangement having three individual LPG containers connected together which is useful in the practice of the present invention;

FIG. 4 is an exploded diagram of a preferred embodiment of the present invention showing the mounting of the internal combustion engine to the LPG container;

FIG. 4A is an exploded diagram of an alternate LPG container and mounting;

FIG. 5 is a partial sectional view of the LPG bottle of the present invention as installed in a structure according to the principles hereof;

DESCRIPTION OF THE PREFERRED EMBODIMENTS

Figure 6:
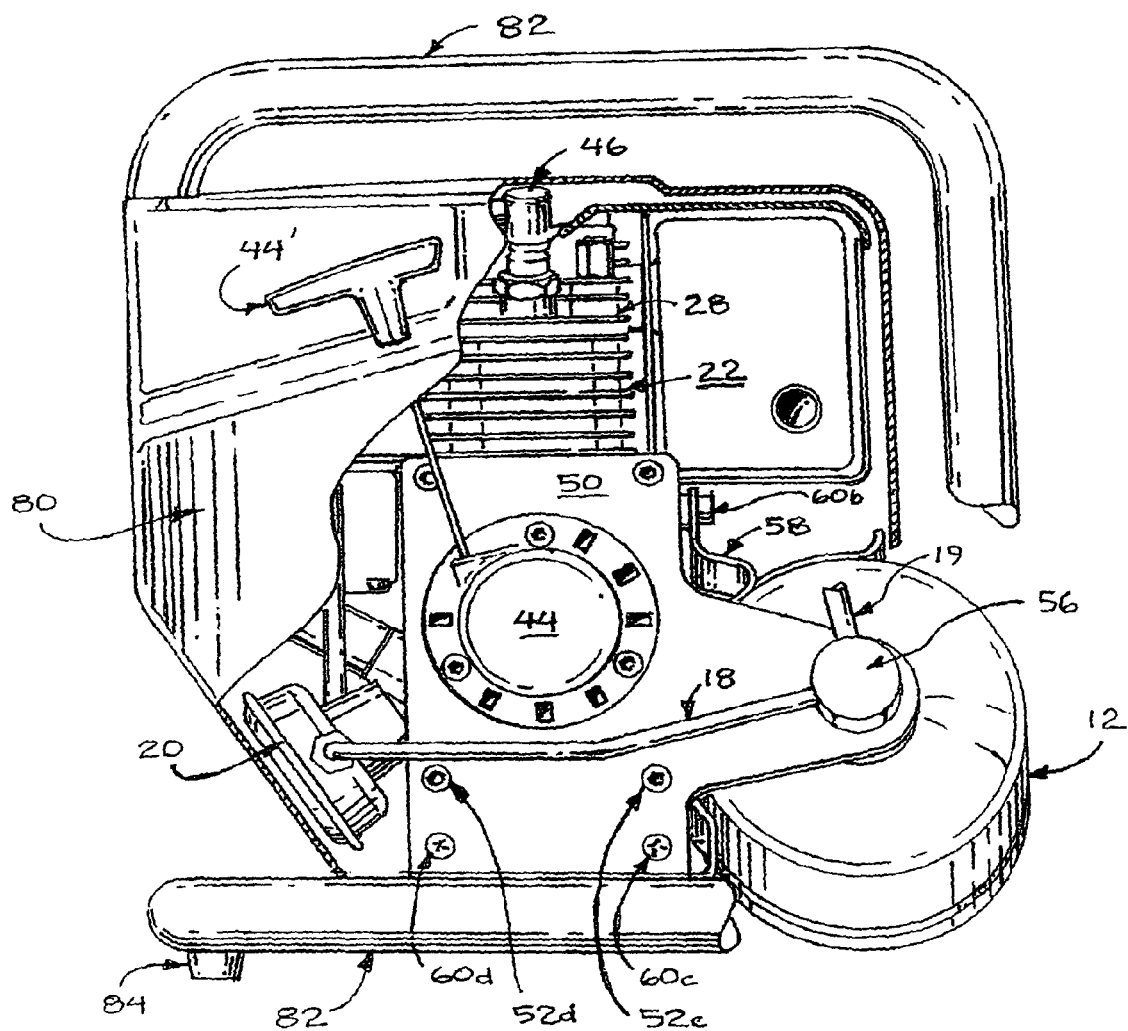
FIG. 6 is a front view of a preferred embodiment of the present invention for an engine driven portable emergency electric power generator.

Referring now to the drawing and in particular FIGS. 1 and 2, there is illustrated in FIG. 1 a block diagram of a preferred embodiment, generally designated 10, of a portable gas powered internal combustion engine arrangement and in FIG. 2 there is illustrated a semi schematic representation of a preferred LPG container 12 as utilized in the embodiment 10. In the LPG container 12 shown in FIG. 2, which in preferred embodiments of the present invention is a Coleman Bottle or similar storage container, there is a liquefied gas under pressure indicated at 14 and also gas phase 16 as evaporated from the liquified gas 14. The gas 16 flows from the LPG container 12 through a conduit indicated at 18. Since the pressure of the gas 16 in the LPG container 12 is much greater than is desired for use in the embodiment 10, the gas flow through conduit 18 is directed to a pressure regulator 20. The pressure regulator 20 regulates the pressure of the gas 16 flowing therethrough to a value on the order of 0.217 psi to 0.365 psi which is the range of pressures that can be utilized for the internal combustion engine 22 as described below, though higher or lower pressures of the gas may be utilized as desired for particular applications.

The gas 16 may also be directed to flow from the conduit 18 through conduit 19 to an auxiliary gas powered device 21 such as an illumination device, cooking device or the like. Such devices are well known and in general have a built in pressure regulator or flow control to regulate the pressure or flow of the gas 16 to a value that compatible with the device 21.

The gas 16 flowing from the pressure regulator 20 is directed through a conduit 23 into a carburetor 24 that is part of the internal combustion engine 22. The carburetor 24 has an air intake as indicated at 26. The carburetor 24 mixes the gas 16 with the air and provides the mixture to the cylinder 28 of the internal combustion engine 22 in a manner well known. The internal combustion engine 22 has a rotating output shaft 30. In the embodiment 10 the rotating output shaft drives an electric generator 32. The electric generator 32 provides electric energy as indicated at 34 and may be, for example in the power range of 300 to 1000 watts though larger power generators may be utilized in other applications. The electric energy may, if desired, be directed to provide 12 volt DC current as indicted at 36 or may be passed into an invertor 38 for conversion to 120 volts AC, 60 cycle as indicted at 40.

As noted above, the internal combustion engine 22 may be a four stroke, or two stroke with appropriate oil injection, air or liquid cooled engine, though in other applications a larger engine may utilized as desired. During the operation of the internal combustion engine 22, the combustion of the gas 16 and air mixture therein in the cylinder thereof generates heat and also vibrates the engine 22. As described below in greater detail, these two factors which are always occurring during the operation of an internal combustion engine are uniquely and advantageously utilized in the operation of the various embodiments of the present invention.

FIG. 2 illustrates in schematic representation, a typical LPG container 12 such as a Coleman Bottle. The LPG container 12 may be of the type manufactured by various entities and may come in a variety of sizes. In general, such LPG containers are provided with a built in safety pressure relief valve 42 to allow the venting of the gas 16 in the event that the pressure thereof exceeds a predetermined value. In the embodiment 10 the LPG container 12 as shown schematically in FIG. 1 may be comprised of a plurality of individual LPG containers joined together to discharge gas 16 through a single outlet such as conduit 18. FIG. 3 schematically shows three LPG containers 12a, 12b and 12c joined together by a manifold 18' to discharge gas 16 through the single conduit 18.

FIG. 4 illustrates an exploded view of the assembly of the LPG bottle 12 and the internal combustion engine 22. The carburetor 24 is mounted on the side of the cylinder 28 atop the crankcase 44. There is provided a spark plug 46 which provides the spark required to ignite the gas/air mixture that is received in the cylinder 28 from the carburetor 24 to drive the output shaft 30. An inertia or recoil type starter 48 is provided to start the operation of the internal combustion engine 22.

A front plate 50 is mounted on the crankcase 44 by bolts 52a, 52b, 52c and 52d. The front plate 50 is provided with a connector 56 that is adapted to engage the output connection 12' of the LPG tank 12. A mounting bracket 58 is rigidly connected to the crankcase 44 of the internal combustion engine 22 and to the front plate 50 by bolts 60a, 60b, 60c and 60d to be in heat receiving and vibration receiving relationship to the internal combustion engine 22. The mounting bracket 58 has a strap 62 which is provided with an over center fastener 64 and the strap 62 is adapted to receive the LPG container 12 therein for snug retention in the cavity 66 when the over center fastener 64 is closed. As noted above, when the LPG container 12 is mounted in the cavity 66 the connector 56 of front plate 50 engages the output connection 12' to allow the flow of gas 16 through the conduit 18 and/or 19.

Since there may be some variation in the size of LPG containers depending on the amount of LPG stored therein and the size desired by a particular manufacturer thereof, FIG. 4A shows an LPG container 12A that may be utilized in the embodiment 10 as shown in FIG. 4. An adapter 70 is provided which has a cavity 72 therein and the walls 72' of the cavity 72 are adapted to provide a snug fit on the LPG container 12A. The outer walls 74 of the adapter 70 are substantially the same diameter as the outer diameter of the LPG tank 12 so that there is a tight fit in the cavity 66 of the mounting bracket 58.

The output shaft 30, in the embodiment 10 is, as described above in connection with FIG. 1, connected to the electric generator 32. However, as described below in connection with other embodiments of the present invention, the output shaft 30 may be connected to any desired type of device that requires a drive engine for operation.

FIG. 5 illustrates the mounting of the LPG tank 12 in preferred embodiments of the present invention. In FIG. 5, the arrow 74 represents the direction of gravity and the horizontal direction as indicated by the line 76 is perpendicular to the direction of gravity 74. As is well known, the latent heat of vaporization of the gas 16 from the liquified gas 14 tends to cool the liquified gas 14 and if too much gas 16 is produced, the liquified gas 14 will freeze to a solid state. Further, the gas 16 is evaporated from the surface 14' of the liquified gas 14. Therefore, it is desired to tend to maximize the surface area of the liquefied gas 14 so that the maximum amount of gas 16 may be provided from a given size LPG container. However, the more gas 16 that is evaporated from the liquified gas 14, the greater is the chance that the liquified gas 14 will freeze to the solid state and thus end the evaporation of significant amounts of gas 16. In the present invention, as shown in FIG. 5, the LPG container 12 is mounted at an angle A to the horizontal and the angle A has been found to be on the order of 12° to 16° with a preferred angle of 15° for the conventional Coleman Bottle LPG container and provides in the angular range that will prevent any liquified gas 14 from entering the conduit 18 even when the container 12 is full. The mounting plate 58 is preferably fabricated from a high heat transfer material such as aluminum so that the maximum amount of heat is transferred by conduction from the engine 22 through the mounting bracket 58 to the wall of the LPG container 12 and thus to the liquified gas 14 because of the direct rigid mounting of the mounting bracket 58 on the internal combustion engine 22. The heat thus transferred to the LPG container 58 from the engine 22 counteracts the latent heat of vaporization and tends to prevent the freezing of the liquified gas 14. Further, the vibration of the internal combustion engine 22 agitates the surface 14' of the liquified gas 14 thereby increasing the surface area to an amount greater than would occur without the vibration. Such agitation increases the surface area 14' of the liquified gas 14 and the conduction of heat to the liquified gas 14 tends to increase the amount of gas 16 that may be generated from the liquified gas 14 for a given size and configuration of the LPG. However, for LPG containers of a different configuration than the Coleman Bottles, a different angular relationship of the LPG container may be required to maximize the surface area of the liquified gas 14 but still prevent the discharge of liquid into the conduit 18 even when the LPG container is full. The use of conductive heat transfer from the engine 22 to the mounting bracket 50 also helps cool the internal combustion engine.

As noted above, in the embodiment 10 the output shaft 30 of the internal combustion engine 22 is connected to an electric generator 32. FIGS. 6 through 9 illustrate the configuration of an embodiment 10 that is small and convenient to carry. As shown on FIG. 6 which is a front view of the embodiment 10 there is a case 80, partially broken away for clarity, in which the internal combustion engine 22 and electric generator are contained. The recoil starter 44 is provided with a pull 44' for operation thereof in a well known manner. As shown in FIG. 6 there is provided a handle 82, partially broken away, for convenient lifting and carrying of the embodiment 10. Feet 84 may be provided on the bottom portion 82' of handle 82 for the support of the embodiment 10 on any desired surface.

Figure 7:
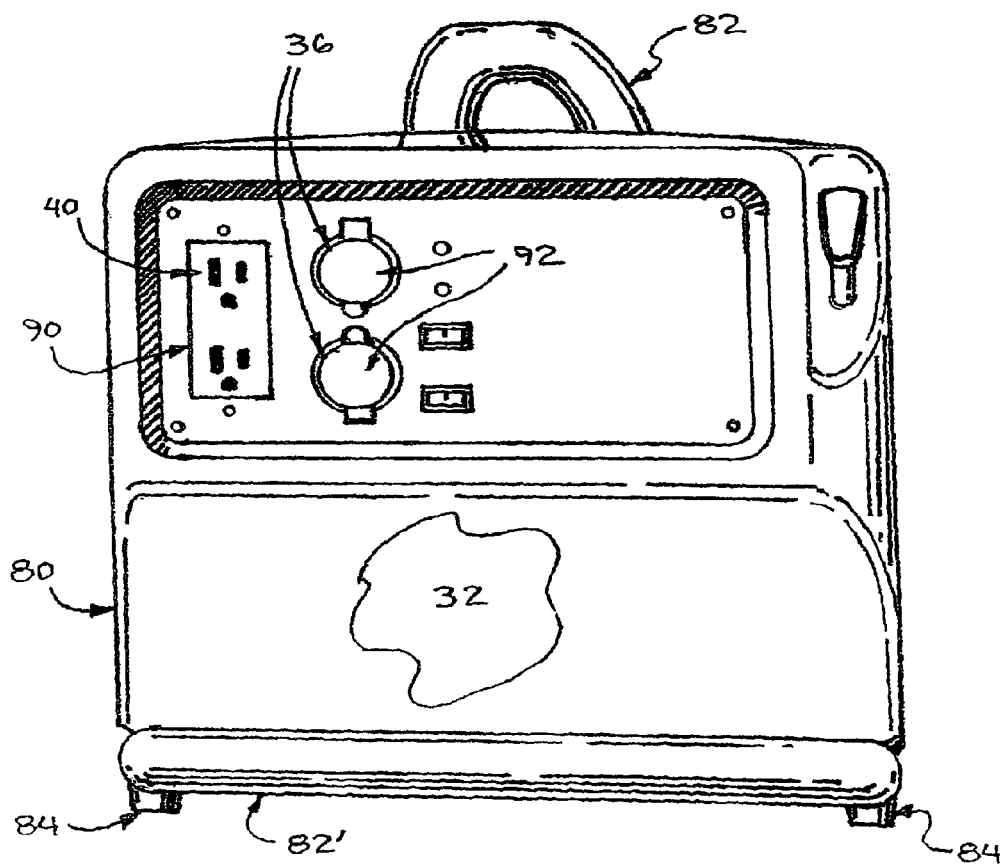
FIG. 7 is a left side view of the preferred embodiment of the present invention shown in FIG. 6.
Figure 8:
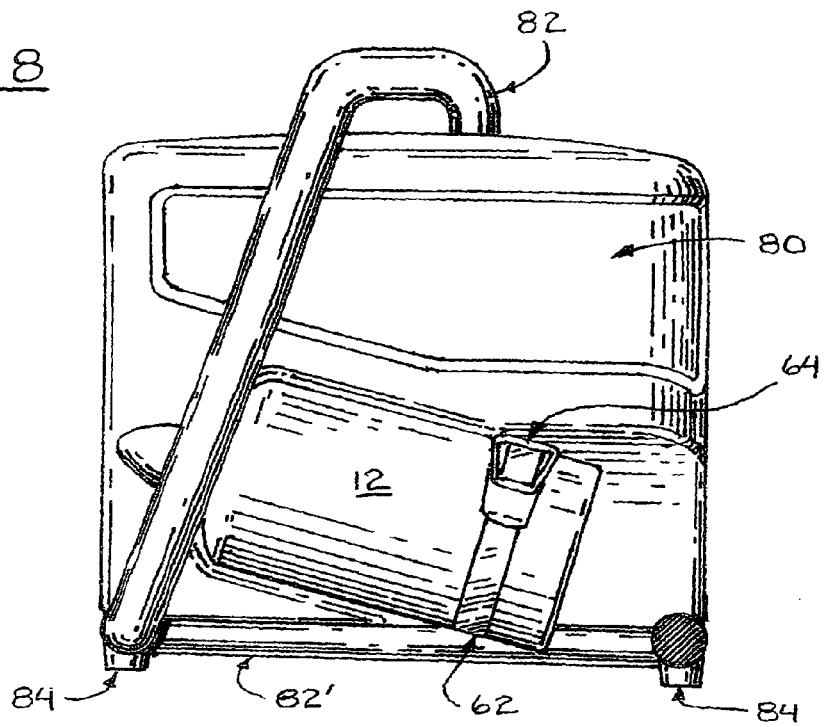
FIG. 8 is a right side view of the preferred embodiment of the present invention shown in FIG. 6.
Figure 9:
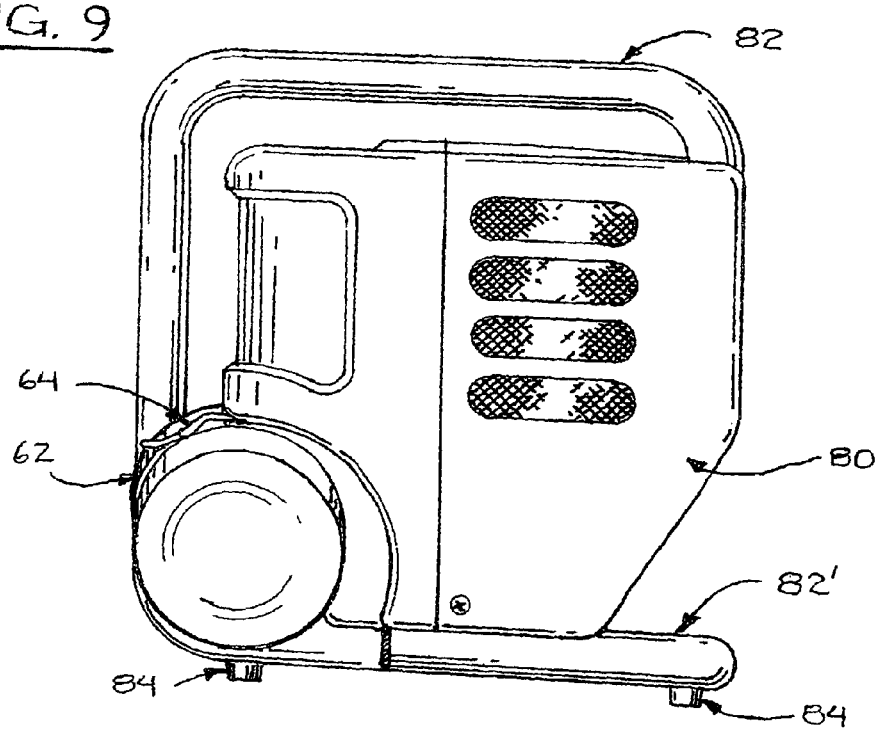
FIG. 9 is rear view of the preferred embodiment of the present invention shown in FIG. 6.

As shown most clearly on FIG. 7, the output electrical energy generated by the electrical generator 32 is provided in both 120 volt AC at dual socket 90 and two 12 volt DC outlets as indicated at 92.

Figure 10:
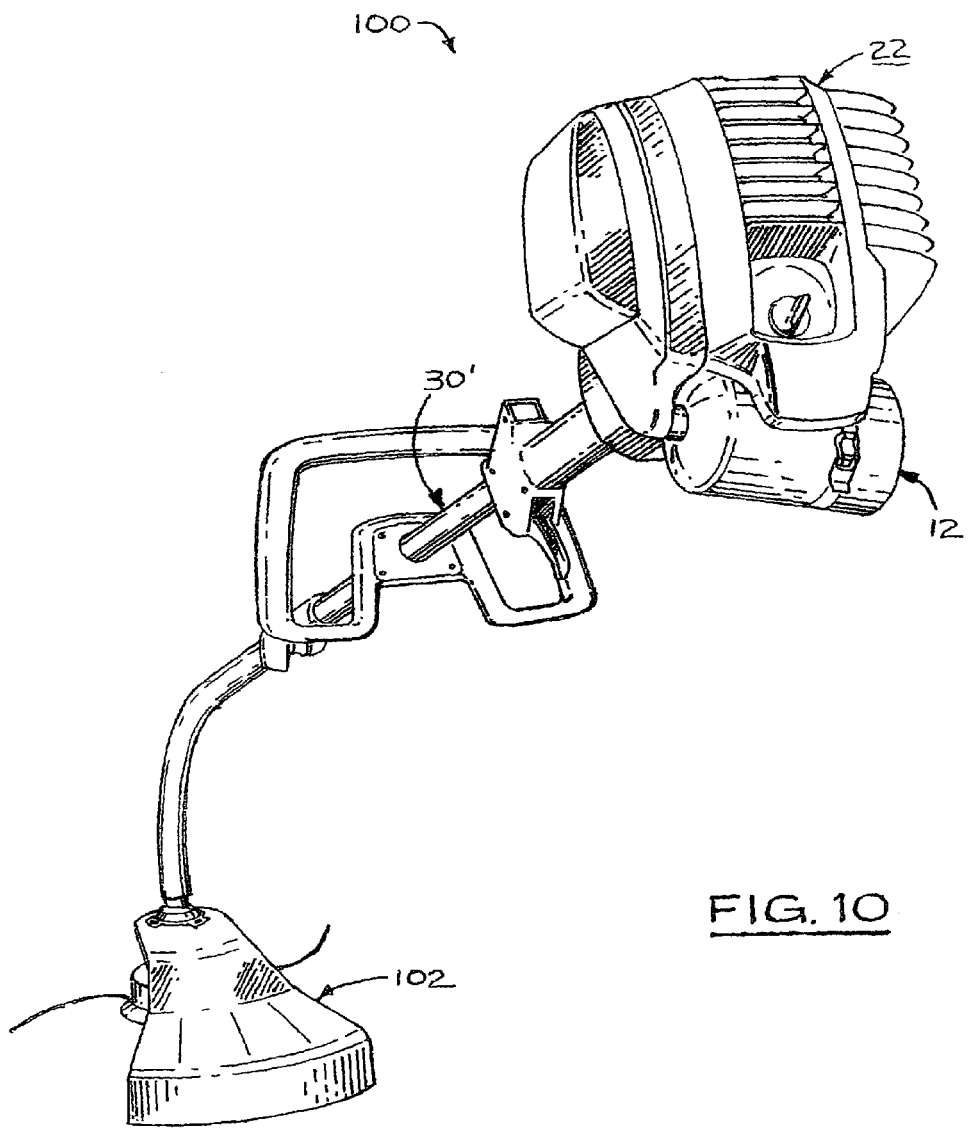
FIG. 10 illustrates an embodiment of the present invention as utilized in a trimmer; and, FIG. 11 illustrates an embodiment of the present invention as utilized in a blower.

FIG. 10 illustrates an embodiment 100 of the present invention as utilized to power a trimmer 102. As shown on FIG. 10, there is provided an internal combustion engine 22 powered by gas from an LPG container 12 and the internal combustion engine 22 rotates an output shaft 30' to rotate the trimmer. Thus, the internal combustion engine and LPG container replace the gasoline powered engine and gasoline tank often utilized in such applications.

Figure 11:
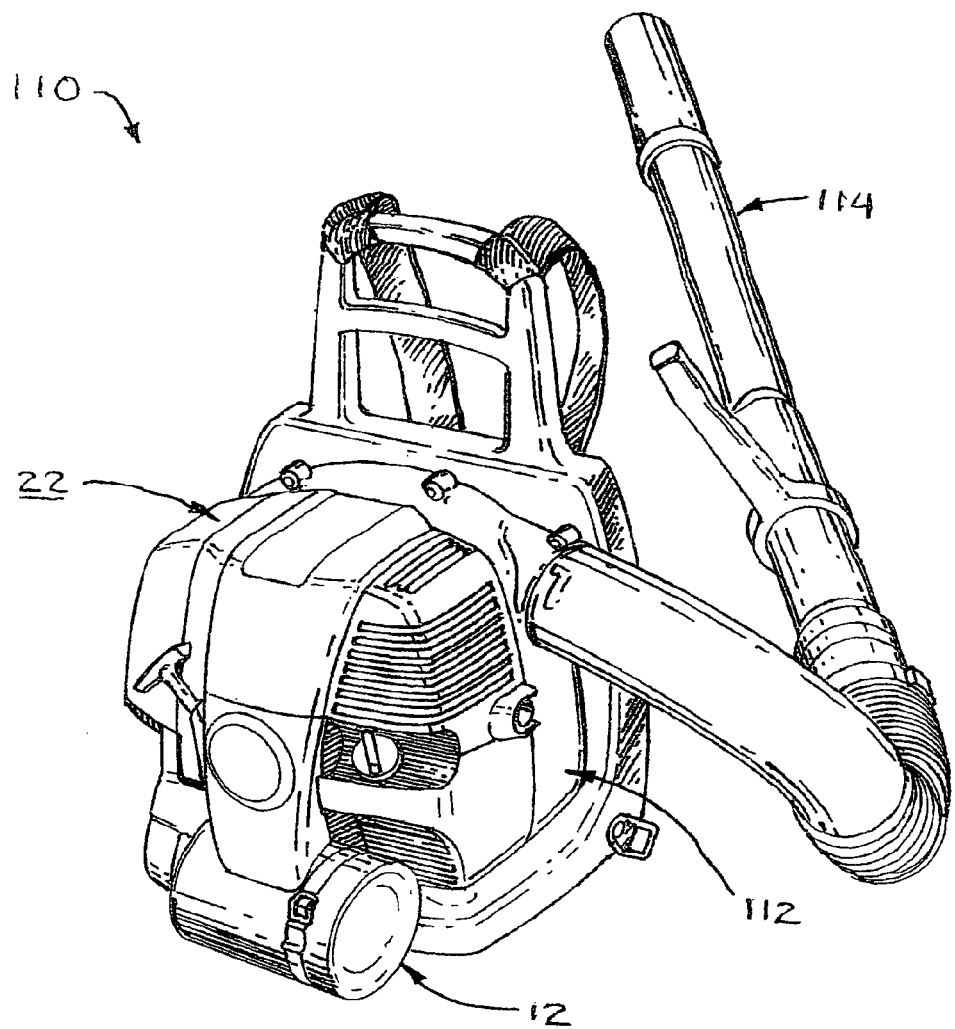

FIG. 11 illustrates an embodiment 110 of the present invention in which an internal combustion engine 22 powered by the gas from an LPG container 12 drives a fan 112 to provide a leaf blower 114. In embodiment 110 the internal combustion engine 22 and LPG bottle 12 replace the gasoline powered internal combustion engine and gasoline storage tank often utilized in such applications.

As described above, there is provided by the present invention a convenient and safe internal combustion engine driven by the gas generated from the liquefied gas in an LPG container and in which the amount of gas to be drawn from the liquefied gas in the LPG is maximized by having the LPG container rigidly connected to the internal combustion engine for both direct conductive heat transfer from the internal combustion engine to the LPG to overcome the cooling due to the latent heat of evaporation of the liquefied gas and to have the internal combustion engine vibrate the LPG container to increase the effective surface area of the liquefied gas. The liquefied gas may be, for example, propane, butane or the like as packaged by many manufactures in various shapes and sizes of LPG containers.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A gas powered internal combustion engine drive arrangement comprising, in combination:
   an internal combustion engine for rotating an output shaft for said internal combustion engine in an operating condition thereof, and said internal combustion engine generating heat and vibration for the condition of said internal combustion engine in the operating condition thereof;
   a mounting bracket rigidly connected to said internal combustion engine for receiving heat and vibration from said internal combustion engine, and said mounting bracket having walls defining a first predetermined geometric configuration;
   a liquefied gas storage bottle having liquefied gas therein and gas phase of said liquefied gas therein and said liquefied gas storage bottle having a preselected external geometric shape;
   an adapter having interior walls defining a cavity and said interior walls of said cavity configured to engage said preselected external geometric shape of said liquefied gas storage bottle for the transmission of heat and vibration thereto, and said adapter having external walls connected to said interior walls for transmitting heat and vibration to said interior walls, and said external walls of said adapter having substantially said first predetermined geometric configuration of said mounting bracket;
   said liquefied gas storage bottle mounted in said cavity of said adapter against said interior walls thereof;
   said adapter rigidly mounted on said mounting bracket for receiving said heat and vibration therefrom whereby said heat and vibration are transmitted to said liquefied gas storage bottle for agitating and heating said liquefied gas stored in said liquefied gas storage bottle to increase the generation of gas phase therefrom
   strap means mounted on said mounting bracket for securing said adapter thereto.

2. A gas powered internal combustion engine drive arrangement comprising, in combination:
   an internal combustion engine for rotating an output shaft for said internal combustion engine in an operating condition thereof, and said internal combustion engine generating heat and vibration for the condition of said internal combustion engine in the operating condition thereof;
   said output shaft of said internal combustion engine connectable to a preselected powered device;
   a mounting bracket rigidly connected to said internal combustion engine for receiving heat and vibration from said internal combustion engine, and said mounting bracket having walls defining a first predetermined geometric configuration;
   an adapter having interior walls defining a liquefied gas storage bottle receiving cavity, and said adapter having external walls connected to said interior walls for transmitting heat and vibration to said interior walls, and said external walls of said adapter having substantially said first predetermined geometric configuration of said mounting bracket;
   said adapter rigidly mounted on said mounting bracket for receiving said heat and vibration therefrom whereby said heat and vibration are transmitted to said interior walls of said adapter; and
   a strap means mounted on said mounting bracket for securing said adapter thereto.

3. A gas powered internal combustion engine drive arrangement comprising, in combination:
   an internal combustion engine for rotating an output shaft for said internal combustion engine in an operating condition thereof, and said internal combustion engine having a crankcase heated for said internal combustion engine in said operating condition;
   a mounting bracket rigidly connected to said crankcase of said internal combustion engine for receiving heat and vibration from said internal combustion engine in the operating condition thereof;
   a liquefied gas storage bottle having liquefied gas therein and gas phase of said liquefied gas therein rigidly and removably mounted on said mounting bracket for receiving said heat and vibration therefrom for agitating and heating said liquefied gas stored in said liquefied gas storage bottle to increase the generation of gas phase therefrom, and said liquefied gas storage bottle having a gas output connection;
   an outlet conduit having a first end connected to said liquefied gas storage bottle and a second end connected to said internal combustion engine for delivering said gas phase of said liquefied gas thereto;
   a pressure regulator mounted on said outlet conduit intermediate said liquefied gas storage bottle and said internal combustion engine for regulating the pressure of said gas phase of said liquefied gas delivered to said internal combustion engine.

4. A gas powered internal combustion engine drive arrangement comprising, in combination:
   an internal combustion engine for rotating an output shaft for said internal combustion engine in an operating condition thereof, and said internal combustion engine having a crankcase heated for said internal combustion engine in said operating condition;
   said output shaft of said internal combustion engine connected to drive a preselected powered tool;
   a front plate mounted on said crankcase of said internal combustion engine, and said front plate having a connector portion;
   a mounting bracket rigidly connected to said crankcase of said internal combustion engine for receiving heat and vibration from said internal combustion engine in the operating condition thereof; and,
   a strap means for securing said liquefied gas storage bottle to said mounting plate.
   a liquefied gas storage bottle arrangement having liquefied gas therein and gas phase of said liquefied gas therein rigidly and removably mounted on said mounting bracket for receiving said heat and vibration therefrom for agitating and heating said liquefied gas stored in said liquefied gas storage bottle to increase the generation of gas phase therefrom, and said liquefied gas storage bottle arrangement having a gas output connection, and said gas output connection engaging said connector portion of said front plate.

5. A gas powered internal combustion engine drive arrangement comprising, in combination:
   an internal combustion engine for rotating an output shaft for said internal combustion engine in an operating condition thereof;
   said output shaft of said internal combustion engine connected to drive a preselected powered gardening tool;
   a mounting bracket rigidly connected to said internal combustion engine for receiving heat and vibration from said internal combustion engine;
   a liquefied gas storage bottle arrangement having liquefied gas therein and gas phase of said liquefied gas therein rigidly and removably mounted on said mounting bracket for receiving said heat and vibration therefrom for agitating and heating said liquefied gas stored in said liquefied gas storage bottle to increase the generation of gas phase therefrom;
   a strap connected to said mounting bracket for engaging said liquefied gas storage bottle arrangement to secure said mounting of said liquefied gas storage bottle arrangement on said mounting plate.

6. A gas powered internal combustion engine drive arrangement comprising, in combination:
   an internal combustion engine for rotating an output shaft for said internal combustion engine in an operating condition thereof;
   said output shaft of said internal combustion engine connected to drive a gardening tool;
   a mounting bracket rigidly connected to said internal combustion engine for receiving heat and vibration from said internal combustion engine;
   a liquefied gas storage bottle arrangement having liquefied gas therein and gas phase of said liquefied gas therein rigidly and removably mounted on said mounting bracket for receiving said heat and vibration therefrom for agitating and heating said liquefied gas stored in said liquefied gas storage bottle to increase the generation of gas phase therefrom; and
   a strap for providing said rigidly and removably mounting of said liquefied gas storage bottle on said mounting bracket; and,
   said strap having an over center buckle.

7. A gas powered internal combustion engine drive arrangement comprising, in combination:
   an internal combustion engine for rotating an output shaft for said internal combustion engine in an operating condition thereof;
   said output shaft of said internal combustion engine connected to drive a preselected power device selected from the class consisting of gardening tools, chain driven saws, and electric generators;
   a mounting bracket rigidly connected to said internal combustion engine for receiving heat and vibration from said internal combustion engine;
   a liquefied gas storage bottle arrangement having liquefied gas therein and gas phase of said liquefied gas therein rigidly mounted on said mounting bracket for receiving said heat and vibration therefrom for agitating and heating said liquefied gas stored in said liquefied gas storage bottle to increase the generation of gas phase therefrom.

8. A gas powered internal combustion engine drive arrangement comprising, in combination:
   liquefied gas storage bottle arrangement having: a predetermined amount of liquefied gas therein and having a predetermined amount of gas phase of the liquefied gas therein, and having
   an outlet connection thereon to allow the flow of said gas phase of said liquefied gas to regions external said liquefied gas storage bottle arrangement;
   an outlet conduit having a first end connected to said outlet connection of said liquefied gas storage bottle arrangement to allow the flow of gas therethrough, and a second end;
   an internal combustion engine for generating heat and vibration during the operation thereof, and said second end of said outlet conduit connected to said internal combustion engine to allow the flow of said gas phase thereto;
   a mounting bracket rigidly connected to said internal combustion engine for receiving said heat and vibration from said internal combustion engine;
   said liquefied gas storage bottle arrangement rigidly mounted on said mounting bracket for receiving said heat and vibration therefrom for agitating and heating said liquefied gas stored in said liquefied gas storage bottle to increase the generation of said gas phase therefrom; and,
   a strap connected to said mounting plate for securing said liquefied gas storage bottle on said mounting bracket.

9. A gas powered internal combustion engine drive arrangement comprising, in combination:
   a generally cylindrical liquefied gas storage bottle having a preselected curvature and having liquefied gas therein, and an outlet connection to allow the flow of gas generated from said liquefied gas therethrough;
   an outlet conduit having a first end connected to said outlet connection of said liquefied gas storage bottle arrangement to allow the flow of gas therethrough, and a second end;
   an internal combustion engine having an operating condition and a non-operating condition, and rotating an output shaft in said operating condition, said internal combustion engine generating heat and vibration in said operating condition thereof, said second end of said outlet conduit connected to said internal combustion engine for transmitting gas thereto;
   a mounting bracket mounted on said internal combustion engine for receiving heat and vibration from said internal combustion engine for the condition of said internal combustion engine in the operating condition thereof, and said mounting bracket having a generally cylindrical wall having a cylindrical curvature substantially the same as said curvature of said liquefied gas storage bottle;
   said liquefied gas storage bottle rigidly mounted on said cylindrical wall of said mounting bracket in heat and vibration receiving relationship thereto,
   whereby said heat and vibration agitates and heats said liquefied gas stored in said liquefied gas storage bottle arrangement.

\* \* \* \* \*